(12) United States Patent
Browning (10) Patent No.: US 6,702,310 B2
(45) Date of Patent: Mar. 9, 2004

(54) TANDEM HANDLE LOCK-OUT TOOL (76) Inventor: Raymond V. Browning, 6 Possum Pass, Louisville, KY (US) 40216

( * ) Notice: Subject to any disclaimer, the term of this patent is extended or adjusted under 35 U.S.C. 154(b) by 44 days.

(21) Appl. No.: 10/146,265

(22) Filed: May 15, 2002

(65) Prior Publication Data

US 2003/0214111 A1 Nov. 20, 2003

(51) Int. Cl.$^7$ ................................................ A47B 96/06
(52) U.S. Cl. ................................ 280/149.2; 248/200
(58) Field of Search ......................... 280/149.2, 81.1; 298/200, 220.1, 300, 247; D8/373, 381; 188/265

(56) References Cited

U.S. PATENT DOCUMENTS

| | | | | |
|---|---|---|---|---|
| 1,214,119 A | * | 1/1917 | Bayne | 248/300 |
| 1,459,404 A | * | 6/1923 | Kleffman | 248/220.21 |
| 2,835,504 A | | 5/1958 | Acker | |
| D184,508 S | * | 3/1959 | Burt | D8/373 |
| 3,021,104 A | * | 2/1962 | Keller | 248/220.1 |
| 3,350,830 A | * | 11/1967 | Smith, Jr. et al. | 52/509 |
| 3,618,969 A | | 11/1971 | Glassmeyer | |
| 3,722,843 A | * | 3/1973 | Enckler | 248/300 |
| 3,987,919 A | * | 10/1976 | Weeks et al. | 414/471 |
| 4,641,846 A | * | 2/1987 | Ehrhart | 280/149.2 |
| 4,746,780 A | * | 5/1988 | Resh | 200/294 |
| D296,520 S | * | 7/1988 | Spinetta | D8/373 |
| D301,686 S | * | 6/1989 | Long | D8/373 |
| D310,520 S | * | 9/1990 | Bedard | D14/432 |
| 4,958,845 A | * | 9/1990 | Parks | 280/407.1 |
| 5,042,766 A | * | 8/1991 | Baker | 248/200.1 |
| 5,199,732 A | | 4/1993 | Lands et al. | |
| 5,480,171 A | * | 1/1996 | Cheffey | 280/149.2 |
| 5,505,475 A | * | 4/1996 | Turner | 280/149.2 |
| 5,507,511 A | * | 4/1996 | Schueman | 280/149.2 |
| 5,678,834 A | | 10/1997 | Wise | |
| 5,897,086 A | * | 4/1999 | Condon | 248/220.1 |
| 6,015,123 A | * | 1/2000 | Perez et al. | 248/220.1 |
| 6,279,932 B1 | | 8/2001 | White et al. | |
| 6,322,091 B1 | | 11/2001 | Lindley | |
| 6,354,642 B1 | * | 3/2002 | Haggerty | 294/19.1 |
| 6,513,776 B1 | * | 2/2003 | Bissett | 248/309.1 |
| 6,568,642 B1 | * | 5/2003 | Kirschner | 248/65 |

* cited by examiner

*Primary Examiner*—Yvonne Abbott
(74) *Attorney, Agent, or Firm*—James E. Cole; Middleton Reutlinger (57) ABSTRACT

A tandem handle lock-out tool for use with a tractor trailer having a first arm and a second arm disposed at about 90 degrees thereto. A first arm may have an aperture for positioning the tool over a tandem handle. The tandem handle lock-out tool may be slidably positioned with an end of the second arm positioned against the tandem axle assembly to maintain the tandem handle in an extended position. The tandem handle lock-out tool may also have a channel disposed in the second arm. The tandem handle lock-out tool may be formed of a flat bar stock with a bend therein or two pieces of bar stock being welded together.

9 Claims, 8 Drawing Sheets

TANDEM HANDLE LOCK-OUT TOOL

BACKGROUND OF THE INVENTION

1. Technical Field of the Invention

The present invention relates generally to a tandem axle assembly for a tractor-trailer. More particularly, the invention relates to a lock-out tool for a tandem axle assembly or "bogie" which binds a tandem handle in an unlocked position so that the bogie may be adjusted for proper weight distribution.

2. Description of the Related Art

The present invention generally relates to a tandem axle assembly or "bogie" on a trailer. The tandem handle lock-out tool maintains a tandem handle in a fully extended position such that the tandem wheels of a trailer may be easily adjusted to a desired position.

Tandem wheels of a tractor-trailer are generally adjustable in order to properly distribute a load over the trailer axles. The tandem axle assemblies or bogies are typically slidably connected to a trailer undercarriage in order that the statutory maximum load, which may vary between states, is not exceeded by any set of wheels. Once the desired weight distribution is obtained the tandem wheels of the tractor-trailer are typically secured in position by means of spring biased pins. The pins extend through apertures in a trailer undercarriage wherein the apertures are arranged in a spaced configuration. The pins retain the bogie in a locked position for road travel. Typically a spring-biased tandem handle must be pulled from the trailer undercarriage to disengage the pins and adjust the tandem axles of the trailer. However, the handles typically will not lock in the extended position due to dirt, wear, and tear on handle slots, specifically the lower portion thereof. Thus, a driver who pulls the tandem handle and returns to the truck cab to pull the truck forward and adjust the tandem wheels may often have to return to the trailer area to again pull the handle to an extended position. This method often takes well over a half-hour to adjust the tandem axle assembly of a trailer. When available, a second person may be used to hold the handle outward in order to adjust the bogie. Many trucking companies however, will not allow a second person to hold the handle in an extended position as the tandem wheels are adjusted. As one can imagine, engaging in this practice may be very dangerous since the moving parts of the trailer may crush or sever limbs or cause strain injury to the person holding the handle.

In view of the deficiencies in known tandem axle assemblies, it is apparent that a tandem handle lock out tool is needed for use with tandem axle assemblies wherein the tandem handle may be forced to remain in an extended position to more easily adjust the tandem axles for proper weight distribution and also save time.

SUMMARY OF THE INVENTION

It is an object of the present invention to provide a tandem handle lock-out tool.

It is a further object of the present invention to provide a tool which may be easily carried by drivers and truck yard workers.

It is an even further object of the present invention to provide a tool which allows tandem axle adjustment to be completed safely and efficiently by a single person.

Specifically, the present invention provides a tandem handle lock-out tool comprising a flat bar having a substantially ninety-degrees bend therein defining a first arm and a second arm. The first arm may have an aperture therein with a diameter of preferably about ¾". The tandem handle lock-out tool may further comprise a protective finish or coating.

The tandem handle lock-out tool may alternatively have a U-shaped channel preferably being about ¾" across located in the first arm. In a further alternative, the tandem handle lock-out tool may have an aperture on a first arm and a channel on a second arm. The tandem handle lock out tool may also be formed of two flat bars connected to form a substantially 90 degrees angle.

All of the above outlined objectives are to be understood as exemplary only and many more objectives of the invention may be learned from the disclosure herein. Therefore, no limiting interpretation of the objectives noted is to be understood without further reading of the entire specification, claims, and drawings included herewith.

BRIEF DESCRIPTION OF THE DRAWINGS

The aspects and advantages of the present invention will be better understood when the detailed description of the preferred embodiment is taken in conjunction with the accompanying drawings, in which.

DETAILED DESCRIPTION OF THE PREFERRED EMBODIMENT

Figure 1:
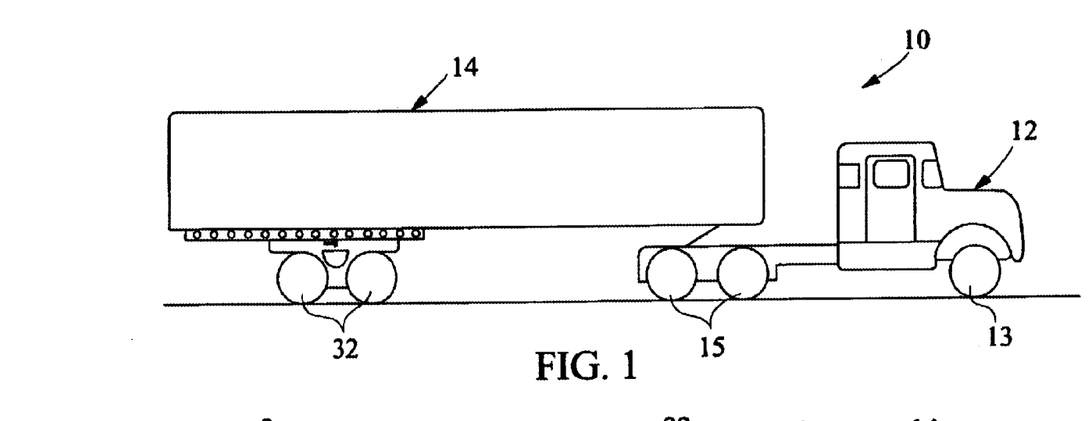
FIG. 1 shows a side view of a tractor-trailer typically used with the present invention.

The present invention will now be described in conjunction with the drawings, referring initially to FIGS. 1 and 2, a tractor trailer 10 is shown. It will be understood that the tractor 12 typically has an engine and front pair of steering wheels 13 and at least one rear pair of drive wheels 15. Connected to the tractor 12 is a trailer 14 for carrying a plurality of manufactured goods and the like. The trailer 14 has an undercarriage 15 and a tandem axle assembly or "bogie" 17 comprising tandem axles 31, a tandem axle bracket 30, and a plurality of wheels 32 rotatably connected to tandem axles 31.

Typically, the tandem axles 31 of a trailer 14 may be moved between a plurality of positions. Forward or rearward adjustment is generally necessary to properly distribute loading on the trailer axles 31 since statutory loading requirements often differ between states. Generally, if the loading is concentrated near the front of the trailer the wheels should be moved forward. In contrast, if the loading is concentrated near the rear of the trailer, the wheels are moved rearward. A problem arises in adjusting the position of the wheels since the task often takes a person more than a half-hour to complete. Moreover, it is expensive to hire a person to work in a trailer yard simply connecting and disconnecting trailers. The tandem handle lock-out tool 60 of FIG. 5 solves this problem.

Figure 3:
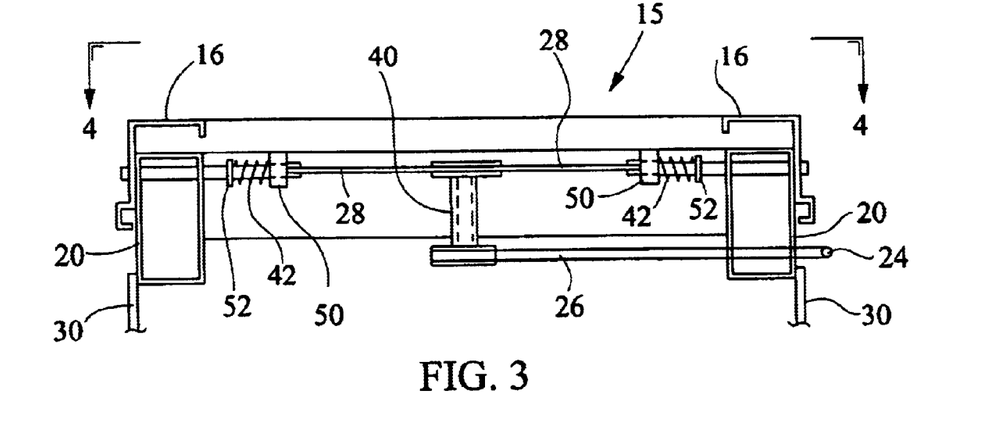
FIG. 3 shows an end view of a typical trailer undercarriage.

As depicted in FIG. 3, the trailer 14 typically has an undercarriage 15 comprising an outer frame rail 16 and an inner frame rail 20. The outer frame rail 16 may be formed from a plurality of shapes while the inner frame rail 20 may be various shapes including a rectangular box shape as shown in FIG. 3. The outer frame rail 20 is fixedly attached to the trailer 14 while the inner frame rail 16 slides relative to the outer frame rail 16 of the trailer 14.

Figure 2:
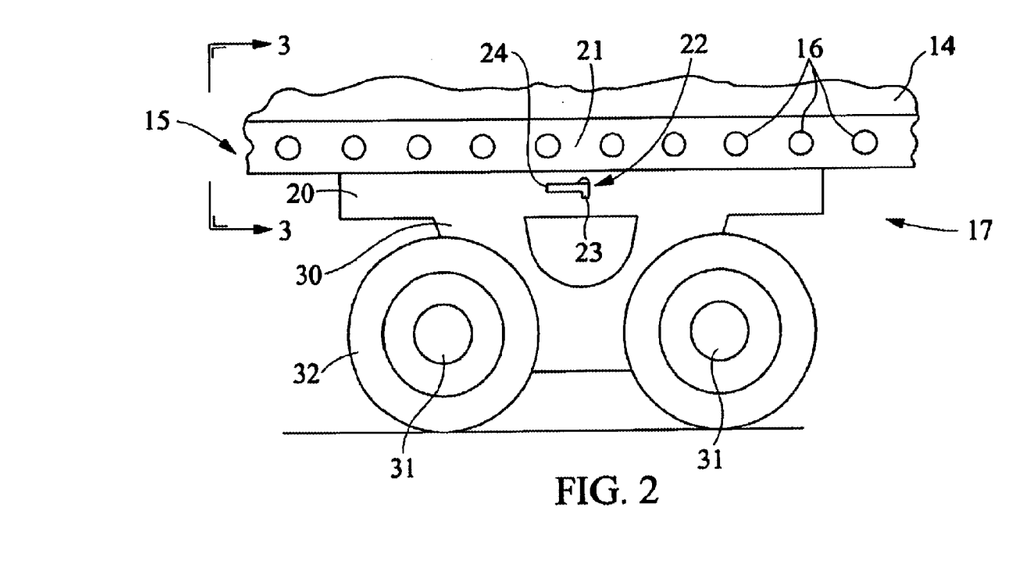
FIG. 2 shows a detail side view of the typical trailer undercarriage and bogie.
Figure 4:
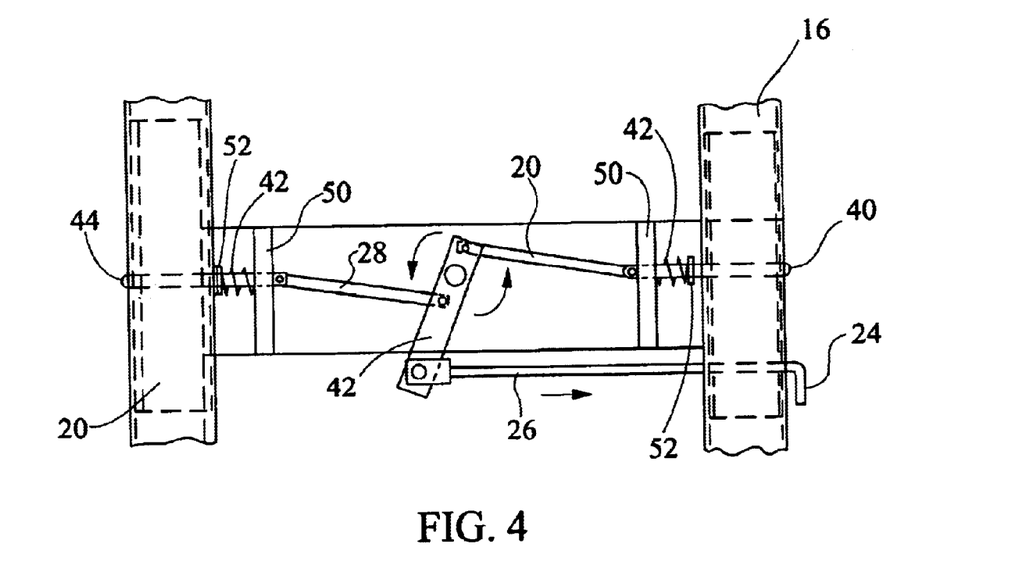
FIG. 4 shows a top view of the trailer undercarriage of FIG. 3.

As shown in FIGS. 2,3,4 a typical trailer undercarriage 15 has a linkage system to engage and disengage the tandem axles 31. The outer rail frame 16 and inner rail frame 20 typically each have a plurality of pin apertures 18 disposed in a linear spaced configuration therethrough. As the inner frame rail 20 slides relative to the outer frame rail 16, the pin apertures 18 intermittently align. When the apertures 18 are aligned pins 40,44 may be disposed therethrough to lock the bogie 17 in place.

Within the inner frame rail 20 is a handle slot 22. The handle slot 22 has an upper slot portion 21 and a lower slot portion 23. Typically, a tandem handle 24 is disposed in the upper slot portion 21. To disengage the outer frame rail 16 from the inner frame rail 20 and move the tandem axles 31, the tandem handle 24 is pulled from the upper slot portion 21 into an extended position and locked in this position by moving the tandem handle 24 into the lower slot portion 23. However, in many trailers, the lower slot portions 23 are often damaged due to dirt, wear, and tear and therefore the tandem handle 24 will not remain locked in the lower slot portion 23.

As best seen in FIGS. 3,4, the tandem handle 24 extends through the inner frame rail 20 and is pivotably connected to a lever 42. The lever 42 is pivotably attached to the trailer undercarriage 15 by a lever pivot 40. Extending through outer frame rail 16 and inner frame rail 20 may be pins 40,44. One of ordinary skill in the art will recognize that there may be other pins in addition to pins 40,44. The pins 40,44 may be spring biased to normally remain in the locked position. Preferably, springs 42 extend from first spring seats 50 to second spring seats 52, which may be welded to pins 40,44. More specifically, the springs 42 maintain bias on pins 40,44 such that the pins 40,44 extend through outer frame rails 16 and inner frame rails 20. Pins 40,44 have pin linkages 28 which connect the pins 40,44 to lever 42.

In a normally disposed position, the handle 24 is typically retracted nearly against the inner frame rail 20 with the pins 40,44 extending through outer and inner frame rails 16,20, as shown in FIG. 4. When the tandem handle 24 is extended from the trailer undercarriage 15 the lever 42 rotates pivoting about the lever pivot 40. As the lever 42 rotates, pin linkages 28 pull the pins 40,44 from the outer and inner frame rails 16,20. This action allows the inner frame 20 and the tandem axle bracket 30 to slide relative to the outer frame 16. When the tandem handle 24 is extended it may be preferably locked by disposing the handle 24 in the lower slot portion 23.

Figure 5:
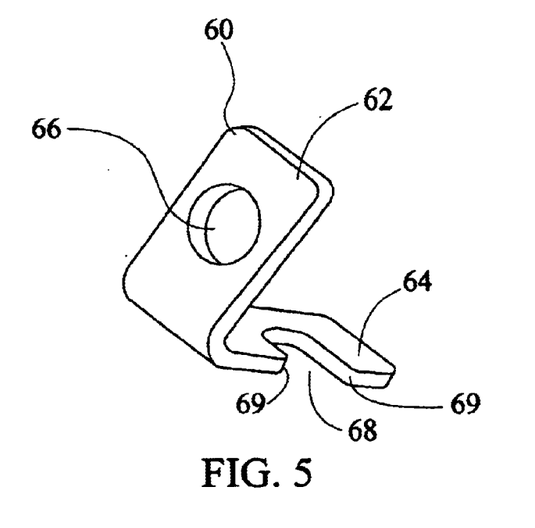
FIG. 5 shows a perspective view of an embodiment of a tandem handle lock-out tool.
Figure 6:
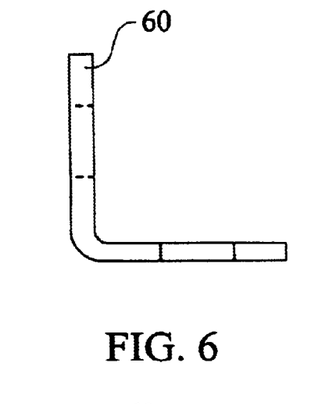
FIG. 6 shows a front view of the tandem handle lock-out tool of FIG. 5.
Figure 7:
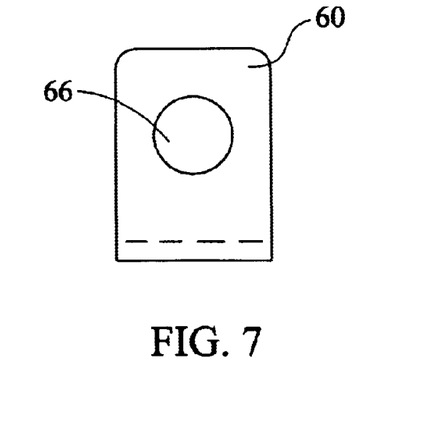
FIG. 7 shows a side view of the tandem handle lock-out tool of FIG. 5.
Figure 8:
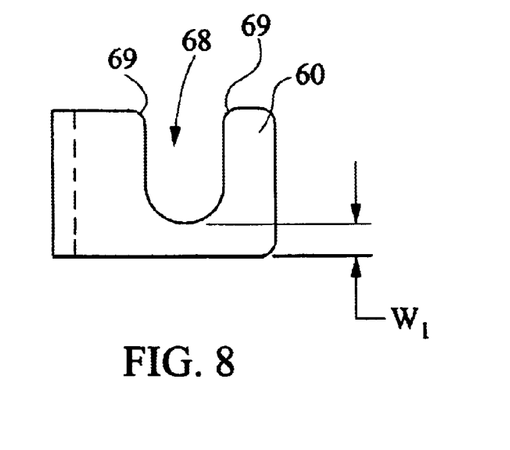
FIG. 8 shows a top view of the tandem handle lock-out tool of FIG. 5.
Figure 9:
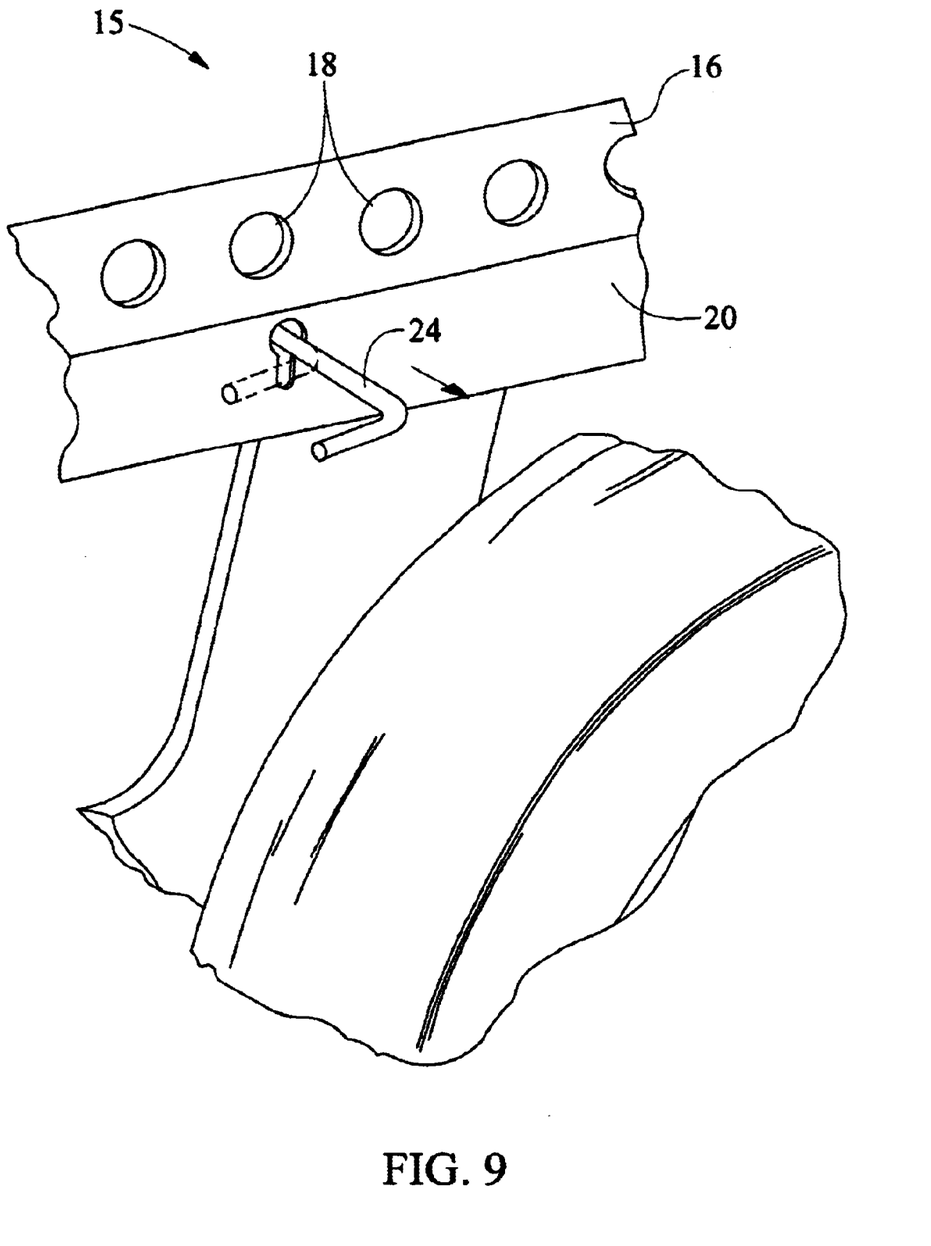
FIG. 9 shows a perspective view of a typical trailer undercarriage and tandem handle.
Figure 10:
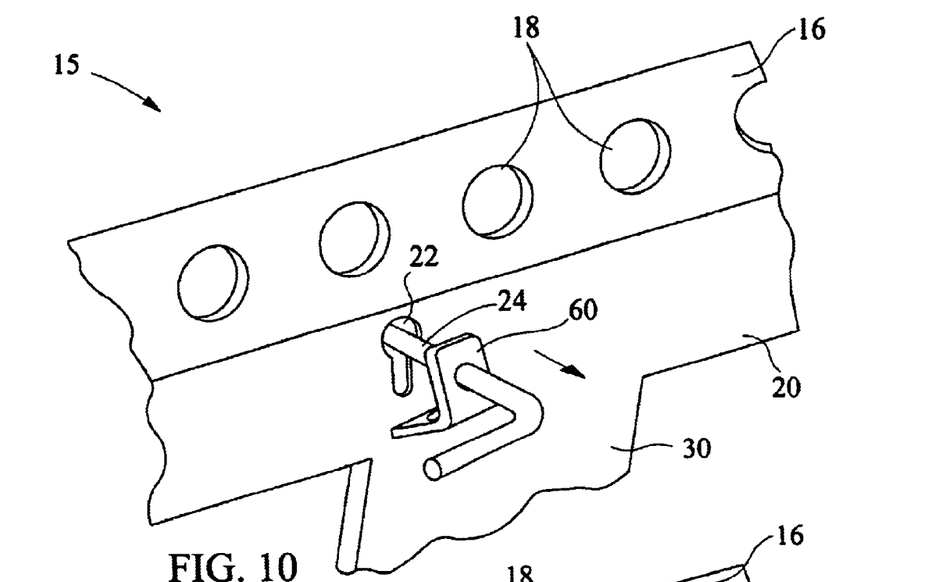
FIG. 10 shows a perspective view of a tandem handle in the extended position having a tandem handle lock-out tool.

A problem arises when the tandem handle 24 is extended, as best shown in FIG. 9, and the tandem handle 24 will not remain in the extended position. The tandem handle lock-out tool 60, shown in FIGS. 5–8, may be used to maintain the tandem handle 24 in an extended position. FIG. 5 shows a perspective view of the tandem handle lock-out tool 60. The tandem handle lock-out tool 60 is preferably made of a flat bar stock having a centrally located bend therein. The bend may range from about 60 to 120 degrees but is preferably 90 degrees. The bend defines a first arm 62 and a second arm 64. Disposed within the first arm 62 may be an aperture 66. The aperture 66 may be any diameter that fits around a typical tandem handle 24. Typically, tandem handles 24 have a diameter of about ⅜" and therefore the diameter is preferably ¾". The arms 62,64 may vary in length but are preferably about two inches (2") long.

Figure 11:
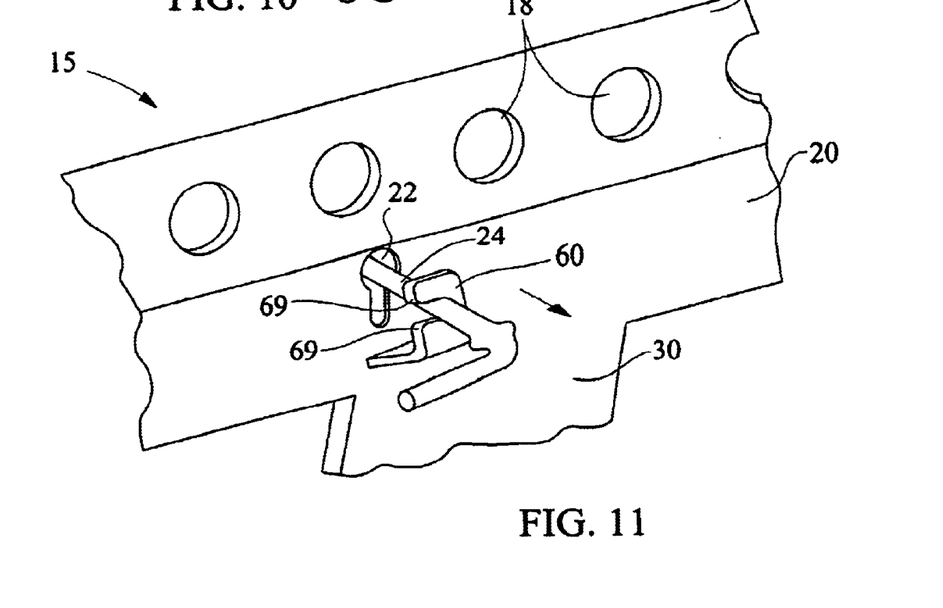
FIG. 11 shows a perspective view of a tandem handle having a bulge requiring use of the channel portion of the tandem handle lock out tool.

Disposed in the second arm 64 is preferably a channel 68. The channel 68 may be U-shaped and preferably is about ¾" across. Moreover, as shown in FIGS. 5,8,11,13,14,16 the upper edges 69 of the channel 68 are preferably radiused to prevent a user from being cut or scratched by a sharp edge. Referring to FIG. 11, the channel 68 is preferably used when a tandem handle 24 has a bulge, grip, or the like inhibiting the tandem handle lock-out tool 60 from sliding over an end of handle 60 to the inner frame rail 20.

The tandem handle lock-out tool 60 is preferably formed from 3/16" A-36 steel. The tandem handle lock-out tool 60 also preferably has a protective finish or coating which is resistant to weather elements, scratches, and corrosion. The tandem handle lock-out tool 60 is sized to be conveniently stored in a pocket or a tractor cab and is handy for truck drivers. The tool 60 may also be handy for truck yard workers who assist truck drivers in connecting and disconnecting trailers and also adjusting bogies.

The tandem handle lock-out tool 60, works by "biting" the metal of the tandem handle 24 and placing the handle 60 in a bind so that the handle may not retract. When the tandem handle is fully extended, the tandem handle lock-out tool 60 is positioned over the handle 24 by either placing the handle 24 through the aperture 66 or within the channel 68. The tandem handle lock-out tool 24 should be positioned with the second arm 64 touching the inner frame rail 20 so that the spring bias causes the tool 60 to pivot against the inner frame rail 20. The force of the spring bias retracting the handle 24 combined with the pivot of the tandem handle lock-out tool 60 causes metal around the aperture 66 to bite or bind the handle 24. This action causes the tandem handle 24 to remain in the extended position.

Figure 12:
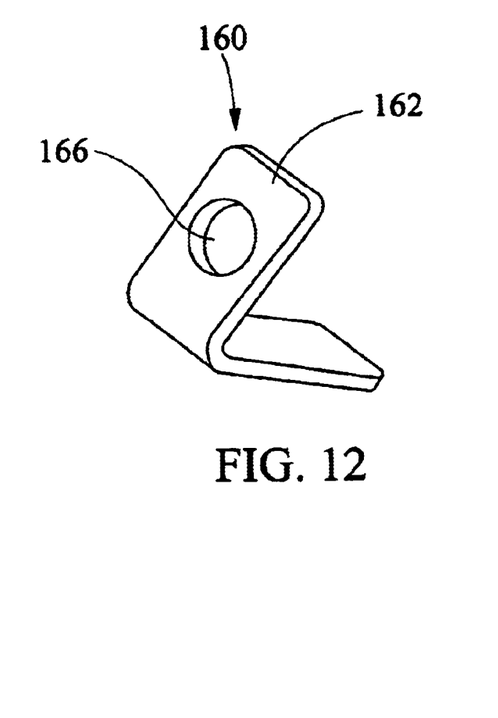
FIG. 12 shows a perspective view of a tandem handle lock-out tool having an aperture.
Figure 13:
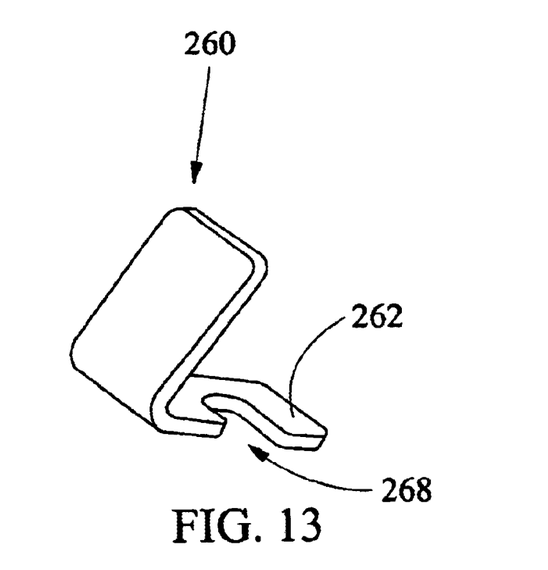
FIG. 13 shows a perspective view of a tandem handle lock-out tool having a channel.
Figure 14:
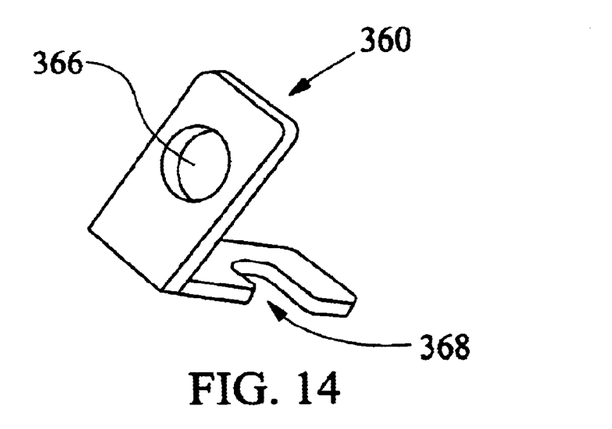
FIG. 14 shows a perspective view of a tandem handle lock-out tool formed of a pair of welded arms.

In an alternative embodiment, shown in FIG. 12, the tandem handle lock-out tool 160 may only have an aperture 166 disposed through the first arm 162. In yet another embodiment, shown in FIG. 13, the tandem handle lock-out tool 260 may only have a channel 268 disposed in the first arm 262. In other words, these embodiments may not have an aperture or channel disposed in the second arm. Moreover, the tandem handle lock-out tool 360 may be formed from two pieces of flat bar stock which are welded together to form the elbow shaped tool as depicted in FIG. 14.

In use, the tandem handle 24 is pulled from the handle slot 22 in the inner frame rail 20. This can be very difficult even when the pins 40,44 are aligned in the pin apertures 18 because the pins 40,44 may be bearing against the inner edge of the pin apertures 18. In order to free the "sticking" pins, the trailer 14 may need to be "rocked" forward or backward to free the bound pins 40,44 from the sides of pin apertures 18.

Once the tandem handle 24 is fully extended, the tandem handle lock-out tool 60 is disposed about the handle 60 in either of two manners. The tandem handle lock-out tool 60 may be slipped over the tandem handle 24 by using the aperture 66 if the tool 60 will slide over the tandem handle 24 to the inner frame rail 20. In a second method, the tandem handle lock-out tool 60 may be disposed about the tandem handle 24 by using the channel 38. The tandem handle lock-out tool 60 should be placed on the tandem handle lock-out tool 60 with the second arm 64 pointing toward the inner frame rail 20. Once the tandem handle 24 is pulled to an extended position, the tool's contact with the inner frame rail 20 in combination with the spring bias on the tandem handle 24 causes the tandem handle lock-out tool 60 to pivot against the tandem axle assembly 17 and bind the handle 24 in an extended position. Next, the inner frame rail 20, tandem axle bracket 30, and wheels 32 may be moved to properly distribute weight over the axles 31. This is done by moving the tractor 12 either forward or backward causing the outer frame rail 16 and trailer 14 to slide relative to the inner frame rail 20. Once the wheels 32 are adjusted to the desired position, the tandem handle lock-out tool 60 is removed and the spring bias on the tandem handle 24 returns the pins 40,44 through the pin apertures 18.

The tandem handle lock-out tool 60 may also be used on vertically adjusting tandem axle mechanisms. One such adjustment mechanism, shown in FIGS. 15,16 has a handle 72 which moves within a substantially C-shaped slot 74. The C-shaped slot has a lower horizontal slot segment 74a, a vertical slot segment 74b, and an upper horizontal slot segment 74c. The handle 72 is normally disposed in the lower slot segment 74a and is connected to a linkage system 78 for retracting pins 40,44 (shown in FIGS. 3,4) from their normally extended position.

Figure 15:
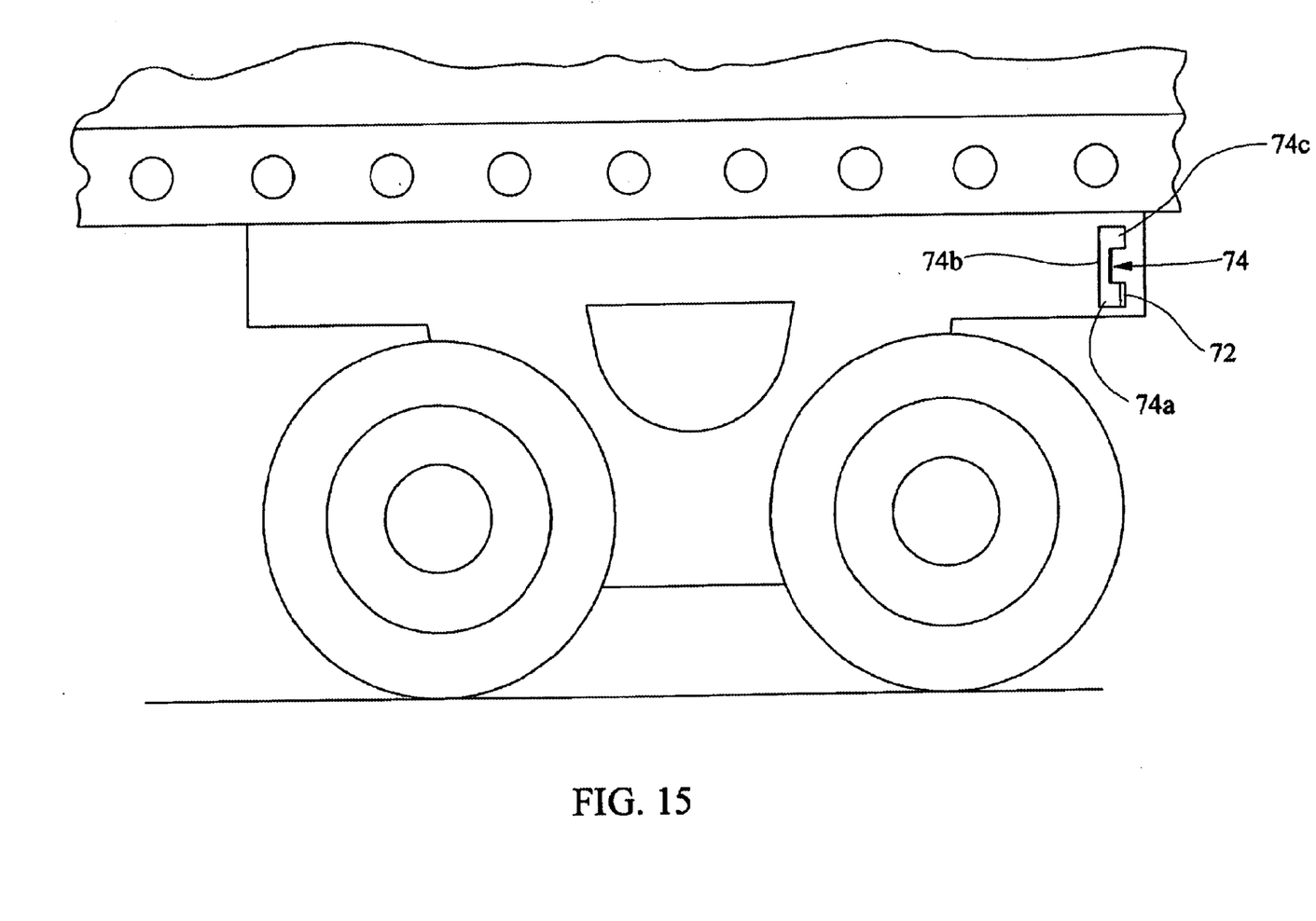
FIG. 15 shows a vertically disposed tandem handle design.
Figure 16:
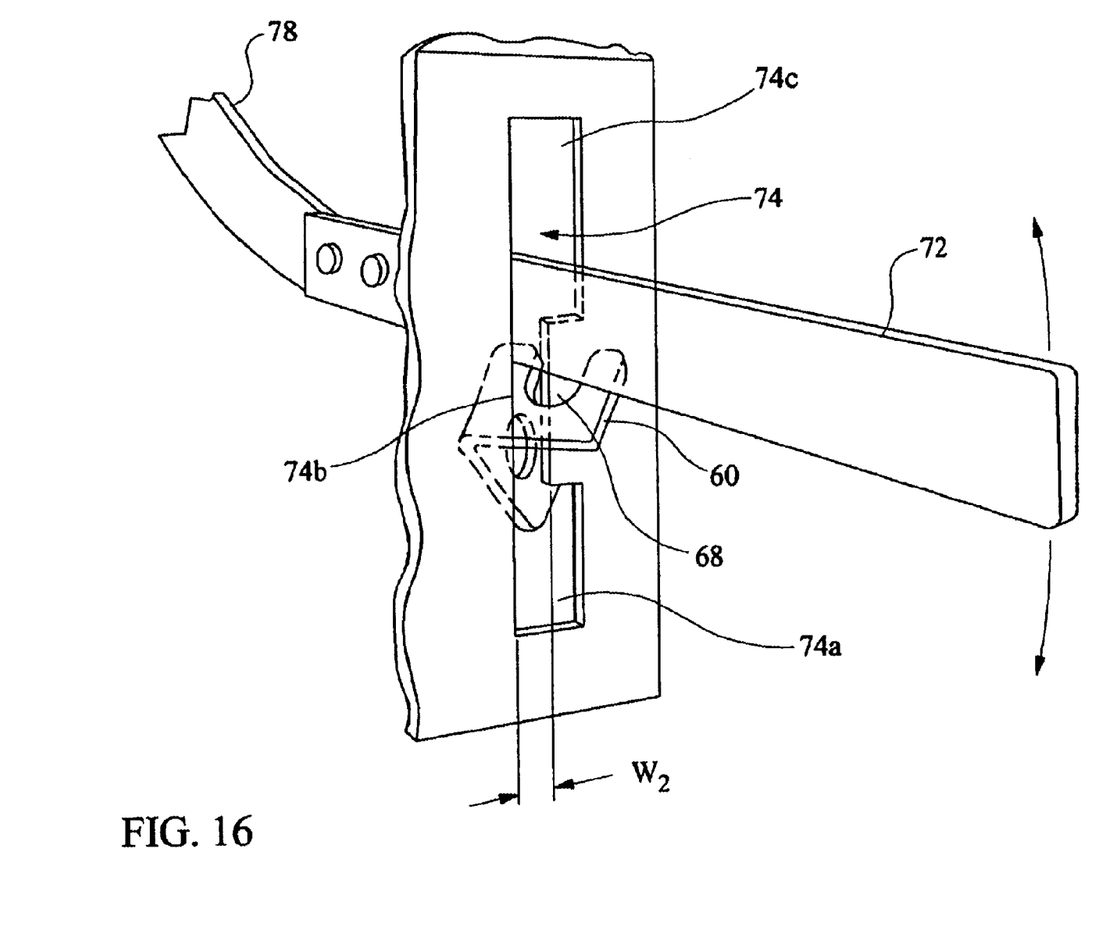
FIG. 16 shows the tandem handle lock out tool being used with the tandem handle design of FIG. 15.

To release pins 40,44 the handle 72 is moved within lower slot segment 74a to the left and then upward within vertical slot segment 74b. As the handle 72 moves upward, the pins 40,44 are retracted from apertures 18. The handle 72 is next moved to the right within upper slot segment 74c to lock the pins 40,44 in a retracted position. However, locking handle 72 in slot segment 74c is often a problem due to wear, tear, and dirt affecting the slot and handle 72.

The tandem handle locking tool 60 also provides a way to lock handle 72. The first arm 62 or second arm 64 of the locking tool 60 having the channel 68 is positioned in the vertical slot segment 74 below handle 72. When the handle 24 is positioned near the upper slot segment 74c the locking tool 60 is rotated wherein the metal defining the slot 74 is partially disposed in the channel 68. For this embodiment to work properly, the width "$W_2$" of vertical slot segment 74b, should be slightly less than the width of between the bottom of the channel 68 and an adjacent side of the tandem handle locking tool 60, shown as "$W_1$" on FIG. 8. The downward spring bias on the handle 72 in combination with the width "$W_1$" being slightly greater than the width W of vertical slot segment 74b effectively "wedges" the locking tool 60 in the vertical slot segment 74b. This prevents the locking tool 60 from sliding down the vertical slot segment 74b. With the handle 72 in an upper portion of the vertical slot 74b, the pins 40,44 retract so that the bogie 17 may be adjusted.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

I claim:

1. A tandem handle lock-out tool, comprising:
   a flat bar having a substantially ninety degree bend therein defining a first arm and a second arm;
   said first arm having an aperture therein;
   a tandem handle disposed in an extended position and through said aperture;
   said tandem handle lock-out tool having an arm end positioned against a tandem axle assembly.

2. The tandem handle lock-out tool of claim 1, further comprising a protective finish.

3. The tandem handle lock-out tool of claim 1, said aperture having a diameter of about ¾".

4. A tandem handle lock-out tool, comprising:
   a first arm and a second arm connected and forming a 90 degree elbow;
   said first arm having a channel therethrough;
   a tandem handle disposed in an extended position, said tandem handle positioned within said channel;
   said tandem handle lock-out tool having an arm end positioned against a tandem axle assembly.

5. The tandem handle lock-out tool of claim 4, said U-shaped channel having radiused upper edges.

6. The tandem handle lock-out tool of claim 4, said U-shaped channel being about ¾" across.

7. The tandem handle lock-out tool of claim 4 further comprising an aperture in said second arm.

8. A tandem handle lock-out tool, comprising:
   a first arm and a second arm connected and forming a 90 degree elbow;
   said first arm having an aperture therethrough;
   a tandem handle disposed in an extended position, said tandem handle positioned through said aperture;
   said tandem handle lock-out tool having an arm end positioned against a tandem axle assembly.

9. A tandem handle lock-out tool, comprising:
   a flat bar having a substantially ninety degrees bend therein defining a first arm and a second arm;
   said first arm having a channel, said tandem handle tool having a width of $W_1$ between said channel and an edge of said tool;
   a tandem handle disposed within a vertical disengaging slot, said slot having a width $W_2$;
   wherein $W_1$ is greater than $W_2$.

* * * * *